US009792425B2

(12) United States Patent
Stone

(10) Patent No.: US 9,792,425 B2
(45) Date of Patent: Oct. 17, 2017

(54) SYSTEM AND METHOD FOR CONTROLLING STATE TOKENS

(75) Inventor: Justin T. Stone, Hopkinton, MA (US)

(73) Assignee: CA, Inc., New York, NY (US)

( * ) Notice: Subject to any disclaimer, the term of this patent is extended or adjusted under 35 U.S.C. 154(b) by 1686 days.

(21) Appl. No.: 12/938,165

(22) Filed: Nov. 2, 2010

(65) Prior Publication Data

US 2012/0110318 A1    May 3, 2012

(51) Int. Cl.
*H04L 9/00* (2006.01)
*G06F 21/41* (2013.01)
*H04L 9/32* (2006.01)

(52) U.S. Cl.
CPC ............ *G06F 21/41* (2013.01); *H04L 9/3234* (2013.01)

(58) Field of Classification Search
USPC ...................................... 713/150, 185; 726/9
See application file for complete search history.

(56) References Cited

U.S. PATENT DOCUMENTS

| | | | | |
|---|---|---|---|---|
| 6,065,117 A * | 5/2000 | White | | 713/159 |
| 6,330,566 B1 | 12/2001 | Durham | | 707/104 |
| 6,421,768 B1 * | 7/2002 | Purpura | | 711/164 |
| 7,225,462 B2 | 5/2007 | Bass et al. | | 726/6 |
| 7,249,369 B2 | 7/2007 | Knouse et al. | | 726/1 |
| 7,472,413 B1 * | 12/2008 | Mowshowitz | | 726/10 |
| 7,571,473 B1 | 8/2009 | Boydstun et al. | | 726/21 |
| 8,132,242 B1 * | 3/2012 | Wu | | 726/8 |
| 2004/0083215 A1 | 4/2004 | de Jong | | 707/7 |
| 2004/0098595 A1 | 5/2004 | Aupperle et al. | | 713/185 |
| 2005/0132222 A1 | 6/2005 | Petrovic | | 713/201 |
| 2005/0154887 A1 * | 7/2005 | Birk et al. | | 713/168 |
| 2006/0031494 A1 | 2/2006 | Marcus et al. | | 709/225 |
| 2006/0271689 A1 | 11/2006 | Kikuchi | | 709/227 |
| 2007/0266045 A1 | 11/2007 | Bansal et al. | | 707/104.1 |
| 2008/0052775 A1 * | 2/2008 | Sandhu et al. | | 726/14 |

OTHER PUBLICATIONS

Kristol, D., et al., "HTTP State Management Mechanism", Network Working Group, Request for Comments: 2109, Category: Standards Track, Feb. 1997, 21 pages.

* cited by examiner

*Primary Examiner* — Vu Le
*Assistant Examiner* — Tracy Mangialaschi
(74) *Attorney, Agent, or Firm* — Pillsbury Winthrop Shaw Pittman LLP

(57) ABSTRACT

The system and method for controlling state tokens described herein may secure sensitive application state tokens, link one application state token to other state tokens that represent certain identities or communication sessions, and maintain application state tokens to integrate various different systems or applications. In particular, the system and method described herein may provide a mechanism to override scheme that applications use to manage state information and thereby enforce policies that provide fine-grained control over any semantics the applications otherwise use to manage state information. Furthermore, a first application state token may be linked to another state token representing a session or identity to validate whether the session or identity represented therein created the first application state token, and state tokens that represent active communication sessions may be copied from browser processes to various external clients to integrate or otherwise share state information across the various external clients.

16 Claims, 4 Drawing Sheets

200

SYSTEM AND METHOD FOR CONTROLLING STATE TOKENS

FIELD OF THE INVENTION

The invention generally relates to a system and method for controlling state tokens, and in particular, to securing sensitive application state tokens, linking an application state token to one or more identities or other state tokens, and maintaining application state tokens to integrate various different systems or applications.

BACKGROUND OF THE INVENTION

In many organizations, workers interact with multiple applications during daily routines to access or input sensitive information. Further, with the proliferation of intranets, business-to-business extranets, cloud applications, and other distributed work environments have lead to customers, partners, and employees demanding anytime, anywhere access to critical applications, information, and services. However, although these information technology developments present new opportunities to increase revenues, manage costs, and deepen relationships with users, opening information technology organizations to distributed work environments can introduce significant security, management, and compliance challenges. For example, because users often interact with sensitive data and multiple applications that can be distributed among various information technology environments, many applications have been front-ended with secure logon processes to handle data security and compliance requirements. However, because different systems and applications typically have different authentication schemes, users often have to enter different authentication credentials to access the various systems and applications. In an effort to accommodate these diverse authentication processes, many users resort to insecure practices such as writing down passwords or using the same password for multiple systems or applications, which can defeat the purpose of secure logon procedures, especially in situations where workers or users share workstations or work areas (e.g., in hospitals or help desk environments).

As such, despite the promise that distributed work environments have to increase revenues, manage costs, and deepen user relationships, existing systems tend to fall short in effectively balancing security needs to protect sensitive data with business needs to provide workers with efficient access. For example, enterprise resource planning (ERP) solutions were originally deployed in client/server implementations, but in recent years many ERP vendors have developed web-based front ends to ease delivering these solutions to users. However, like any other standalone application, these solutions tend to come with distinct security systems and require separate logon processes. While most ERP solutions generally provide single sign-on (SSO) capabilities between the individual ERP components, they typically do not integrate access security with other web-based applications that may be distributed across the organization. Thus, because many organizations have initiated efforts to move towards web-based approaches to deliver applications that need to meet information and access needs for substantial numbers of internal and external users, the need to extend SSO capabilities across the organization has become increasingly important. Further, to let business in while keeping risk out, many organizations have sought to standardize and centralize information technology infrastructures, including security management. These factors, among others, result in a strong desire within the information technology community to have a single access management system that can provide centralized authentication, authorization, auditing, and SSO across all web-enabled applications.

To that end, various systems have been developed to provide vendor supported, policy-based mechanisms to apply consistent security to web-enabled applications that communicate via Hypertext Transfer Protocol (HTTP). However, HTTP was designed to provide a stateless transport mechanism, which can raise problems with managing applications that require state maintenance (e.g., maintaining a communication session, shopping cart, etc.). As such, existing systems typically use various mechanisms to maintain state across multiple HTTP requests, most commonly an HTTP cookie that authentication information, site preferences, shopping cart contents, session identifiers, or other state information that can be communicated between a web browser and a web server. However, the HTTP Cookie specification does not provide any built-in mechanisms to secure the information contained within a cookie, lacks mechanisms to specify a link between one cookie and another, and does not provide mechanisms that specify how to transport a cookie from one HTTP client to another. Thus, although existing systems have sought to provide mechanisms to consistently secure web-enabled applications, the underlying transport protocol that web-enabled applications use to handle communications lack suitable mechanisms to integrate security across various distributed applications that may need to share state information, whereby existing systems tend to fall short in providing an integrated solution that can share state information across various web-enabled applications.

SUMMARY OF THE INVENTION

According to one aspect of the invention, a system and method for controlling state tokens may generally provide various mechanisms to secure sensitive application state tokens, link one application state token to one or more identities or other state tokens, and maintain application state tokens to integrate various different systems or applications. For example, the system and method described herein may provide a mechanism that can override schemes that one or more applications use to manage state information, wherein the system and method described herein may operate in a framework that can enforce various state management overrides to define policies that provide fine-grained control over any default or other existing semantics that the applications use to manage tokens representing the state information. Furthermore, in one implementation, the system and method described herein may link a first application state token to another state token that represents a certain identity or communication session, whereby the first application state token may be validated with a comparison between information contained therein and the communication session or identity represented in the other state token. For example, the first application state token may be rejected in response to determining that the first application state token was not created by the session or identity that the other state token represents, or alternatively validated in response to determining that the session or identity represented in the other state token created the first application state token. In one implementation, state tokens that represent active communication sessions may be copied from browser processes to various clients or applications external to the browser processes, which may further provide a mechanism to share information contained in the state tokens among the external clients and applications and thereby integrate state information across the various external clients and applications.

According to one aspect of the invention, the system and method for controlling state tokens described herein may include or operate on a web server having various modules that provide the functionality associated with the state token control mechanisms noted above. In particular, the web server may generally include, among other things, a token input/output (I/O) module that can handle inbound and outbound state token processing, and may further include a token validation module that can validate whether a particular state token complies with any control parameters or other constraints associated with the state token. Furthermore, in one implementation, the web server may include a configuration module that communicates with one or more agent configuration objects that reside on a policy server via an agent application program interface, wherein the policy server and the agent configuration objects residing thereon may configure the token I/O module and the token validation module that handle inbound, outbound, and validation processing for the state tokens controlled thereby. Thus, the policy server and the agent configuration objects may provide a state token control mechanism to configure and manage inbound, outbound, and validation state token processing in the web server. In one implementation, the web server may further include a transaction module that can control or otherwise manage the state tokens (e.g., securing the state tokens, linking multiple state tokens to one another, embedding control or validation information within the state tokens, etc.). As such, the token I/O module, the token validation module, the configuration module, and the transaction module residing on the web server may collectively provide the state token control framework, which may be used to secure, link, or otherwise control identities, policies, or other constraints associated with the state tokens.

According to one aspect of the invention, the system and method described herein may secure sensitive application state tokens. In particular, one or more of the modules located on the web server may encrypt application cookies or other state tokens, which may alternatively referred to herein simply as "state tokens," with one or more keys retrieved from the key store located on the policy server. Thus, the keys retrieved from the policy server and used to encrypt the state tokens may secure any information contained in the state tokens. In particular, the secured state tokens may be opaque during transit between the web server and a web browser operating on a client device, opaque to any applications that receive the state tokens from the web browser or another suitable source (e.g., the guarded state token may be opaque to the application and replaced with an unguarded state token value, which may be transparent to the application, at a time when subsequently invoking the application), and transparent to any servers that interact with such applications (e.g., in response to a suitable server receiving the encrypted and secured state tokens, the server may retrieve the key previously used to encrypt the state token from the key store to decrypt the state tokens and read the contents contained therein).

According to one aspect of the invention, the system and method described herein may further control one or more parameters in a header associated with a state token. In particular, the web server may create a state token with one or more parameters included in a header associated with the state token in response to a request from a web browser executing on a client device and then and the created state token to the web browser in order to create the state token on the client device. For example, in one implementation, the state token header may generally include various name/value pairs or other string sequences that define the control parameters associated with the state token, wherein the parameters may include an expiration date, a domain name and/or path, a restriction on resources authorized to receive the state token, or other suitable control parameters. Thus, the web server may override any default parameters or scoping rules that the web browser may otherwise use to determine whether or not to return the state token to a requesting application or resource (e.g., the web server may embed one or more rules that define a domain and path where the state token may be considered valid, modify a default name associated with the state token to obscure the name initially assigned to the state token, and configure guarded state tokens to be persistent or transient within a token store residing on the client device).

According to one aspect of the invention, the system and method described herein may further control a validity lifetime associated with guarded state tokens. In particular, the web server may specify maximum lifetimes, maximum use counts, or other validity parameters that define one or more conditions under which guarded state tokens will be considered valid. Further, because certain applications tend to update state tokens with another state token having an identical name (i.e., replacing original values contained in the state token with new values), any state tokens that authorized applications have appropriately updated may become new guarded state tokens with new maximum lifetimes, maximum use counts, or other validity parameters. For example, in response to the web server receiving a state token from the web browser on the client device, the web server may determine whether the maximum lifetime, maximum use count, or other validity parameters have lapsed. As such, any state token received at the web server that has not been updated prior to the validity parameters lapsing may be rejected, or alternatively validated in response to the validity parameters not having lapsed. In addition, the web server may block updates for certain state tokens in the token store on the client device, block certain applications from updating the state tokens in the token store, or otherwise provide fine-grained control over whether or not the state tokens in the token store can be updated.

According to one aspect of the invention, the system and method described herein may further embed a validator into a guarded state token to link multiple guarded state tokens. In particular, the validator embedded into a particular guarded state token may represent a particular identity or communication session that created the guarded state token, whereby in response to receiving any requests that include or otherwise associated with the guarded state token, the web server may inspect the validator associated with the guarded state token to verify whether an identity or session currently using the guarded state token matches the identity or session that initially created the guarded state token. For example, the validator may include an identifier associated with a user session that creates the guarded state token, or in scenarios where the guarded state token may persist longer than the user session that created the state token, the validator may include an identifier associated with the user that created the state token. Thus, the validator embedded therein may generally link the guarded state token to a communication session or identity that created the guarded state token, whereby a guarded state token having a validator that matches a current communication session or a current identity may be validated, or alternatively rejected in response to the validator failing to match the current communication session or the current identity.

According to one aspect of the invention, the system and method described herein may control or otherwise use state tokens to integrate various different systems or applications. In particular, the web server may include or otherwise implement software that supports web-based applications and cloud services, which the system and method may integrate with one or more software solutions that can securely manage delivering the web-based applications and cloud services, create operating system identities that the web-based applications and cloud services can consume, or otherwise provide fine-grained control over application identities and policies used in the web-based applications and cloud services. For example, a user interacting with the client device may be assigned a unique identity managed on a suitable authentication server, wherein the user may provide access credentials to the authentication server to obtain a single sign-on (SSO) authentication token that encapsulates any suitable permissions or other characteristics associated with the unique identity assigned to the user. As such, the client device may derive an identity associated with the software executing on the web server from the unique identity encapsulated in the SSO authentication token, and the client device may include the derived identity in a request subsequently communicated to the web server. In one implementation, the web server may create a state token with the software executing thereon from the identity that the client device derives and communicates to the web server. Thus, the created state token may be used to manage interactions between any suitable application that interacts with the software executing on the web server and thereby integrate the unique identity assigned to the user with the software executing on the web server.

According to one aspect of the invention, the system and method described herein may further integrate the various different systems or applications through one or more software solutions that can provide full-fledged identities associated with certain operating systems to the web server. In particular, these software solutions may generally obtain the unique identity that encapsulates the various permissions and other characteristics associated with the user to create a user token that provides a context within a particular operating system, which the web server may then use to control access to certain resources associated with that operating system. For example, to interact with an object using a particular application that runs under a particular operating system, a user interacting with the client device may request the object within the web browser. The request communicated within the web browser may therefore include the SSO authentication token associated with the user, and the web server may return the requested object to the web browser in response to validating that the user has permission to access the object. In one implementation, the web browser may then launch the application associated with the object and query the web server to request information relating to the object using a separate web-based client associated with the application. As such, to interact with the object in the operating system that supports the application, the request communicated from the web-based client associated with the application may include the user token that provides the context within such operating system. Accordingly, the web server may then employ the user token associated with the operating system to control access to the requested information relating to the object.

Other objects and advantages of the invention will be apparent to those skilled in the art based on the following drawings and detailed description.

DETAILED DESCRIPTION

Figure 1:
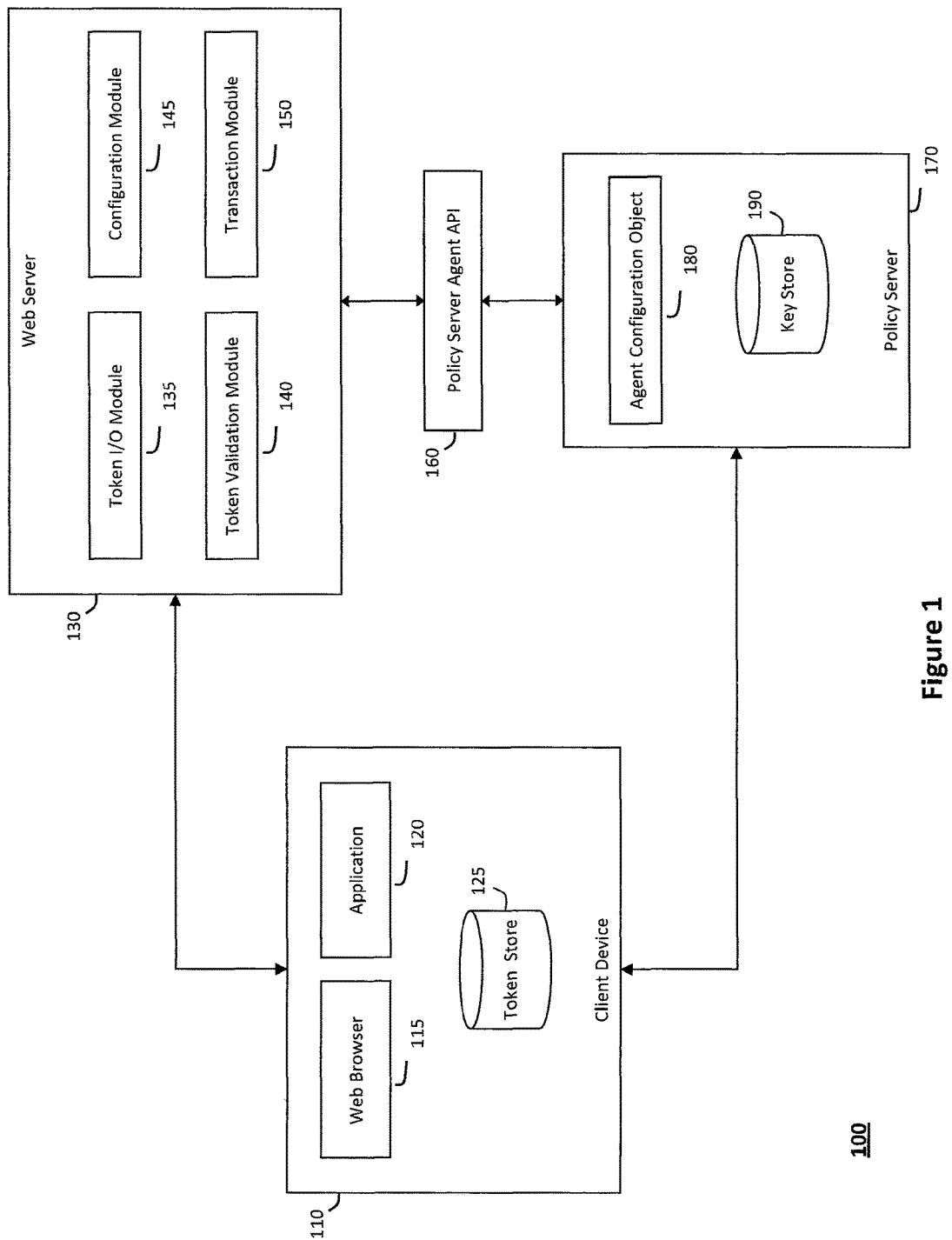
FIG. 1 illustrates an exemplary system that can secure sensitive state tokens, link multiple state tokens to one another, integrate various different systems or applications with state tokens, and otherwise control state tokens, according to one aspect of the invention.

According to one aspect of the invention, FIG. 1 illustrates an exemplary system 100 that can secure sensitive state tokens, link multiple state tokens to one another, integrate various different systems or applications with state tokens, and otherwise control state tokens. In particular, the system 100 illustrated in FIG. 1 may generally provide various mechanisms to secure sensitive application state tokens, link one application state token to one or more other state tokens that represent certain communication sessions or identities, and maintain application state tokens to integrate various different systems or applications. For example, as will be described in further detail herein, the system 100 may override schemes that one or more applications use to manage state information, wherein the system 100 may operate in a framework that can enforce various state management overrides to define policies that provide fine-grained control over any default or other semantics that the applications use to manage tokens representing the state information. Furthermore, in one implementation, the system 100 may link a first application state token to another state token that represents a certain identity or communication session, whereby the first application state token may be validated in response to determining that the identity or session represented in the other state token created the first application state token, or alternatively rejected in response to determining that the identity or session represented in the other state token did not create the first application state token. In one implementation, state tokens that represent active communication sessions may be copied from browser processes to various external clients or applications, which may share information contained in the state tokens among the various external clients or applications and thereby integrate state information across the various external clients or applications. In one implementation, as will be described in further detail herein, the system 100 shown in FIG. 1 may generally include a web server 130 having various modules that provide the mechanisms noted above to control state tokens.

In particular, the web server 130 may generally include, among other things, a token input/output (I/O) module 135 that can handle inbound and outbound state token processing and a token validation module 140 that can validate whether a particular state token complies with any control parameters or other constraints associated with the state token. Furthermore, in one implementation, the web server 130 may further include a configuration module 145 that communicates with one or more agent configuration objects 180 that reside on a policy server 170 via an agent application program interface 160, wherein the policy server 170 and the agent configuration objects 180 residing thereon may configure the token I/O module 135 and the token validation module 140 that handle inbound, outbound, and validation processing for the state tokens controlled thereby. Thus, the policy server 170 and the agent configuration objects 180 may provide a centralized mechanism that can configure and manage inbound, outbound, and validation state token processing in the web server 130. Furthermore, the web server 130 may include a transaction module 150 that provides functionality to control or otherwise manage the state tokens, wherein the functionality provided with the transaction module 150 may include encrypting or otherwise securing the state tokens, linking multiple state tokens to one another, and embedding validation information within the state tokens, among other things. For example, the transaction module 150 may utilize one or more keys contained in a key store 190 located on the policy server 170 to encrypt the state tokens or otherwise leverage any key management mechanisms that the policy server 170 may provide. As such, the token I/O module 135, the token validation module 140, the configuration module 145, and the transaction module 150 deployed on the web server 130 may collectively provide the framework to control state tokens, wherein the state token control framework may be packaged within a standalone framework or bundled with the policy server 170 and/or components associated therewith to control or otherwise manage identities, policies, or other controls associated with the state tokens.

In one implementation, as noted above, the system 100 may provide a mechanism to secure sensitive application state tokens. In particular, although the HTTP Cookie specification described in "HTTP State Management Mechanism," the contents of which are hereby incorporated by reference in their entirety, generally describes mechanisms that can restrict the manner in which a web browser 115 executing on a client device 125 returns a cookie or other state token, the HTTP Cookie specification lacks any built-in mechanisms to secure the information contained in the cookie or other state token to maintain the state information. Rather, the information contained in the cookie or other state token must be encrypted to protect the information contained therein from unauthorized inspection. As such, in one implementation, the transaction module 150 located on the web server 130 may be configured to encrypt application cookies or other application state tokens, which may alternatively referred to herein simply as "state tokens," with one or more keys retrieved from the key store 190 located on the policy server 170, thereby securing the information contained in the state tokens. The secured state tokens may therefore be opaque during transit between the web server 130 and the web browser 115, opaque to any applications 120 that receive the state tokens from the web browser 115, and transparent to the web server 130, the policy server 170, or any other servers that interact with such applications 120. For example, in response to the web server 130, the policy server 170, or other servers receiving the encrypted and secured state tokens, the servers may retrieve the appropriate key from the key store 190 to decrypt the state tokens and read the contents contained therein.

In one implementation, the transaction module 150 located on the web server 130 may further control one or more parameters in a Set-Cookie header that the web server 130 returns to the web browser 115 in response to a request in order to create the state token on the client device 110. In particular, the Set-Cookie header generally includes various name/value pairs or other string sequences that define control parameters associated with the state token, wherein the parameters may include an expiration date, a restriction on domain names or resources that can receive the state token, or other suitable control parameters. Thus, the transaction module 150 may be configured to override any default parameters or scoping rules that the web browser 115 uses to determine whether or not to return the state token to a requesting application 120 or other resource. For example, in one implementation, the transaction module 150 may embed one or more rules that control a valid domain and path associated with the state token, modify a name for the state token to obscure the state token, and permit state tokens that have been guarded or otherwise controlled to be persistent or transient within a token store 125 that maintains the guarded or otherwise controlled state token on the client device 110 regardless of whether the original unguarded state token was created with a persistent or transient state.

In one implementation, the transaction module 150 may further control a validity lifetime associated with guarded state tokens. In particular, the transaction module 150 may specify a maximum lifetime, a maximum use count, or other validity parameters that define one or more conditions under which a particular guarded state token will be considered valid. Further, because certain applications 120 often update state tokens with another state token having an identical name, replacing original values contained in the state token with new values, any state tokens contained in the token store 125 that authorized applications 120 have appropriately updated may become new guarded state tokens with new maximum lifetimes, maximum use counts, or other validity parameters. For example, in response to the web server 130 receiving a state token from the web browser 115, the token validation 140 may determine whether the maximum lifetime, maximum use count, or other validity parameters have lapsed. As such, any state token received at the web server 130 that has not been updated prior to the validity parameters lapsing may be rejected, or alternatively validated in response to the validity parameters not having lapsed. In addition, the transaction module 150 may be configured to block updating certain state tokens in the token store 125 from being updated, block certain applications from updating the state tokens in the token store 125, or otherwise provide fine-grained control over updating the state tokens in the token store 125 (e.g., blocking updates to a particular guarded state token may cause the guarded state token to only maintain initial values and become invalid according to any initially defined usage lifetimes or validity parameters).

In one implementation, the transaction module 150 may further embed a validator into guarded state tokens in order to link multiple guarded state tokens with one another. In particular, the validator embedded into a particular guarded state token with that the transaction module 150 may represent a particular identity or communication session that created the guarded state token, whereby the validation module 140 may inspect the validator to verify that an identity or session currently using the guarded state token matches the identity or session that initially created the guarded state token. For example, in one implementation, the validator may include an identifier associated with a current user session, or for instances where the guarded state token may persist longer than the current user session, the validator may include an identifier associated with the current user, such as a Lightweight Directory Access Protocol (LDAP) Distinguished Name (DN). Thus, the validator embedded in the guarded state token may generally link the guarded state token to a communication session or identity that created the guarded state token, whereby a guarded state token having a validator that matches a current communication session or identity may be validated, or alternatively rejected in response to the validator failing to match the current communication session or identity.

In one implementation, as noted above, the various state token control mechanisms may further include integrating various different systems or applications. In particular, the web server 130 may be installed or otherwise implemented on a Microsoft SharePoint server, which the system 100 may generally integrate with one or more software solutions that can securely manage delivering web-based applications 120 and cloud services (e.g., CA SiteMinder®), provide operating system identities, or otherwise manage fine-grained control over application identities and policies. For example, in one implementation, a user interacting with the client device 110 may be assigned a unique identity, wherein the user may provide access credentials to the policy server 170 or another suitable authentication server. In response to validating the access credentials provided from the client device 110, the policy server 170 or other suitable authentication server may return a single sign-on (SSO) authentication token to the client device 110 that encapsulates various permissions associated with the unique identity assigned to the user. As such, in one implementation, the client device 110 may then derive a Microsoft .NET identity from the unique identity encapsulated in the SSO authentication token via a Microsoft .NET Forms Based Authentication mechanism, and the client device 110 may include the .NET identity in a request subsequently communicated to the web server 130. In one implementation, the web server 130 may then maintain a .NET created state token named ASPXAUTH from the .NET identity communicated from the client device 110, wherein the .NET created state token may be used to manage interactions between any suitable application 120 that interacts with the Microsoft SharePoint server and thereby integrate the unique identity assigned to the user with the Microsoft SharePoint server.

In one implementation, integrating the various different systems or applications used in the system 100 may be further provided through one or more software solutions that can provide full-fledged identities associated with certain operating systems to the Microsoft SharePoint server. In particular, these software solutions may generally obtain the unique identity assigned to the user that encapsulates the various permissions associated therewith to create a user token that provides a context within a particular operating system, which the web server 130 may then use to control access to certain resources. For example, to edit a document with an application 120 executing on the client device 110 (e.g., a web-based word processing application 120, a desktop word processing application 120, or any other suitable application 120), a user interacting with the client device 110 may request the document to be edited within the web browser 115. The request communicated from the web browser 115 may therefore include the SSO authentication token associated with the user, and the web server 130 may return the requested document to the web browser 115 in response to validating that the user has appropriate permissions to access the document. In one implementation, the web browser 115 may then launch the application 120 to edit the document, and the application 120 may query the web server 130 to request information relating to the document using a separate web-based client. As such, because the application 120 generally executes in a particular operating system (e.g., a desktop Microsoft Office application 120 running in Microsoft Windows), the request communicated from the web-based client associated with the application 120 may include the user token that provides the context within the operating system that executes the application 120, wherein the web server 130 may then use the user token associated with the operating system to control access to the requested information relating to the document (e.g., as described in further detail below with reference to FIG. 4).

Figure 2:
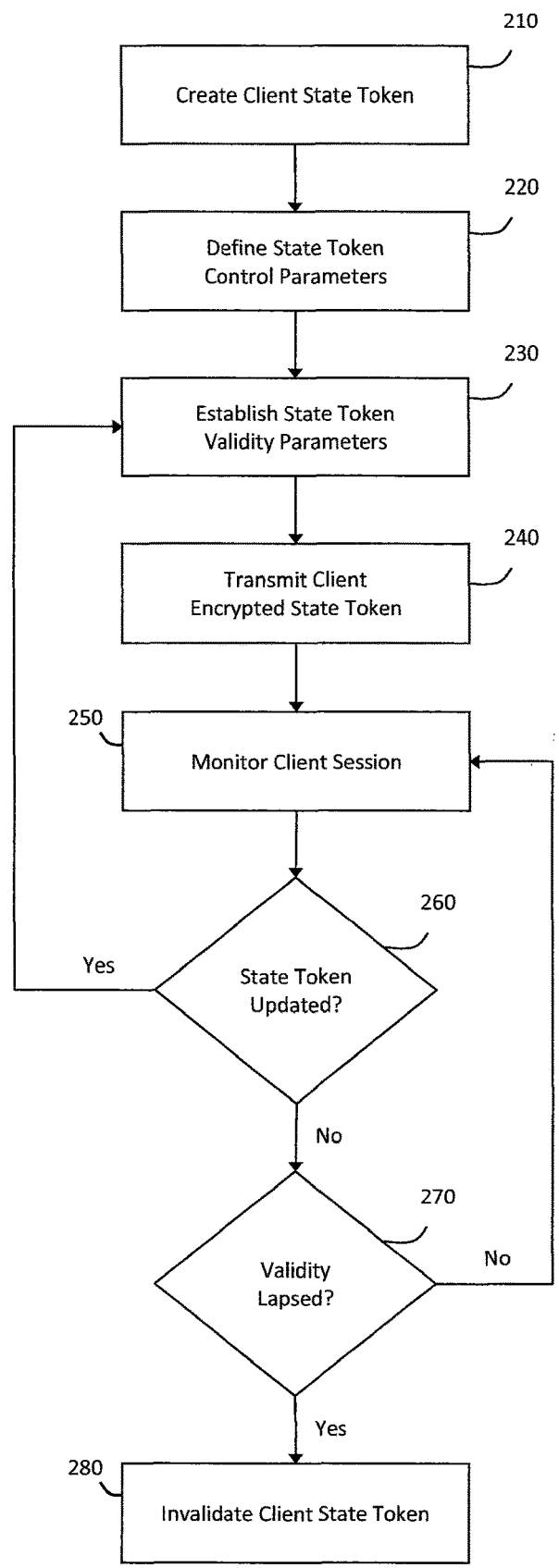
FIG. 2 illustrates an exemplary method that can secure and otherwise control sensitive state tokens, according to one aspect of the invention.

According to one aspect of the invention, FIG. 2 illustrates an exemplary method 200 that can secure and otherwise control sensitive state tokens. In particular, the method 200 illustrated in FIG. 2 may generally operate in a system substantially similar to the system shown in FIG. 1 and described in further detail above, wherein the method 200 illustrated in FIG. 2 may generally provide various mechanisms to secure sensitive application state tokens and establish parameters that control application state token validity lifetimes. For example, the method 200 may be performed to override schemes that one or more applications use to manage state token information (e.g., defining policies that provide fine-grained control over default semantics that applications use to manage state tokens).

In one implementation, as noted above, the method 200 may provide a mechanism to secure sensitive application state tokens. For example, an operation 210 may include a web server creating an encrypted application cookie or other application state token (alternatively referred to herein simply as a "state token"), wherein the encrypted application state token may be created in response to a request from a client application, a client device, or another suitable client that communicates with the web server. In one implementation, the client state token created in operation 210 may be encrypted with one or more keys, thereby securing the information contained in the state tokens. In particular, encrypting the client state token with the one or more keys may cause the client state token to be opaque during transit between the web server and a web browser associated with the client, opaque to any applications that receive the state token from the web browser, and transparent to the web server or any other servers that interact with such applications or otherwise use the client state token. For example, in response to the web server receiving the encrypted and secured client state token, the server may retrieve the appropriate key from the key store to decrypt the client state token and read the contents contained therein to determine whether or not to validate the client state token (e.g., as described in further detail below).

In one implementation, an operation 220 may include the web server defining one or more control parameters that can manage governance, risk, and compliance issues using the state token (e.g., restricting resources that can access the state token, defining conditions under which the state token may be updated, etc.). For example, in one implementation, operation 220 may include the web server writing information to a header associated with the client state token, which the web server may return to the web browser on the client device to deliver the state token on the client device. In one implementation, the header may include various name/value pairs or other information that define the control parameters associated with the state token, wherein the parameters may include an expiration date, a domain name, a restriction on resources that can receive the state token, or other suitable control parameters. Thus, in operation 220, the web server may override any default parameters or scoping rules that the web browser may otherwise use to determine whether or not to return the state token to a requesting application or other resource. For example, the control parameters defined in operation 220 may include one or more rules that control a valid domain and path associated with the state token, modify a name for the state token to obscure the state token, and permit state tokens that have been guarded or otherwise controlled to be persistent or transient within a token store that maintains the guarded or otherwise controlled state token on the client device regardless of whether the original (i.e., unguarded) state token was created with a persistent or transient state.

In one implementation, an operation 230 may further include the web server establishing one or more parameters that define a validity lifetime associated with the guarded state token. For example, in one implementation, the validity parameters may specify a maximum lifetime, a maximum use count, or other validity parameters that define one or more conditions under which a particular guarded state token will be considered valid or invalid. In response to suitably creating the client state token, defining the control parameters associated with the state token, and establishing the validity parameters associated with the state token, the web server may then transmit the encrypted state token to the client in an operation 240. Furthermore, because certain applications often update state tokens with another state token having an identical name, thereby replacing one or more values originally contained in the state token with new values, the method 200 may further include managing one or more sessions occurring on the client device that may include interactions with the client state token.

For example, in one implementation, the control parameters defined in operation 220 may indicate whether or not the client state token can be appropriately updated. In particular, as noted above, certain applications tend to update state tokens with another state token having an identical name to replace values originally contained therein. As such, an operation 250 may include monitoring one or more sessions on the client device, wherein the sessions on the client device may be monitored to determine whether or not the client state token has been updated. In one implementation, in response to determining that one or more of the monitored sessions have updated the client state token in an operation 260 (e.g., assuming that the control parameters associated with the state token permit updates), the maximum lifetime, maximum use count, or other validity parameters established in operation 230 may be renewed with a new maximum lifetime, maximum use count, or other validity parameters (i.e., the method 200 may return to operation 230 to renew the validity parameters, thereby essentially treating the renewed client state token as a new client state token). Furthermore, in response to the sessions on the client device communicating a request associated with the state token to the web server, an operation 270 may include the web server determining whether or not the validity for the client state token has lapsed. For example, the web server may validate whether the maximum lifetime, maximum use count, or other validity parameters have lapsed for the client state token, wherein the web server may reject or otherwise invalidate the client state token in an operation 280 in response to determining that the state token has not been updated prior to the validity parameters lapsing. Alternatively, in response to the web server determining that the validity parameters have not lapsed in operation 270, the method 200 may return to operation 250 to continue monitoring the sessions on the client.

Figure 3:
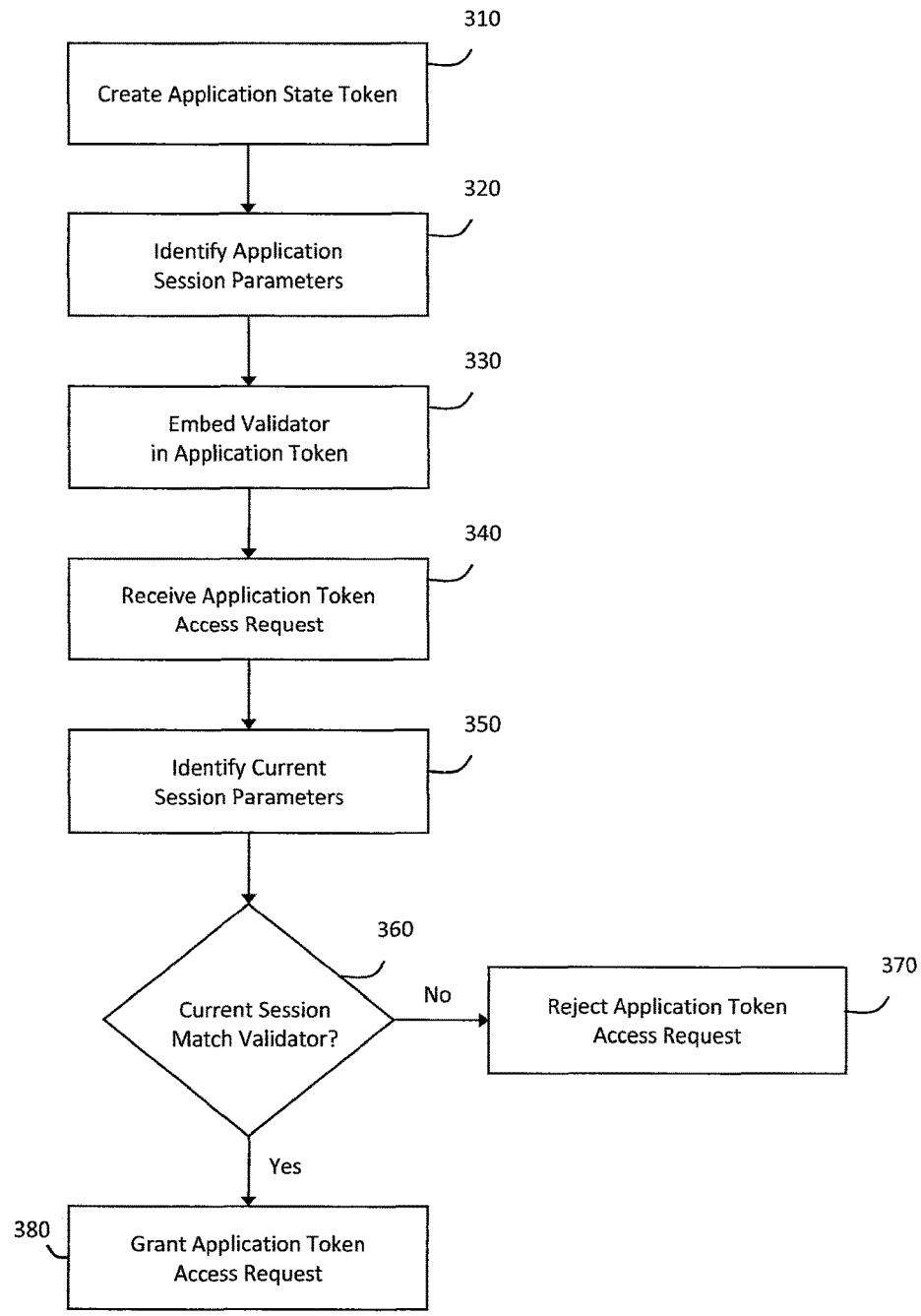
FIG. 3 illustrates an exemplary method that can embed validators into state tokens to link multiple state tokens to one another, according to one aspect of the invention.

According to one aspect of the invention, FIG. 3 illustrates an exemplary method 300 that can embed validators into state tokens to link multiple state tokens to one another. In particular, the method 300 illustrated in FIG. 3 may generally operate in a system substantially similar to the system shown in FIG. 1 and described in further detail above, wherein the method 300 illustrated in FIG. 3 may generally provide various mechanisms to link one application state token to one or more other state tokens that represent certain communication sessions or identities. For example, in one implementation, the method 300 may be performed to link an application state token to another state token that represents a certain identity or communication session.

In one implementation, as noted above, the method 300 may provide a mechanism to link an application state token to one or more other state tokens that represent certain communication sessions or identities. For example, an operation 310 may include a web server creating an encrypted application cookie or other application state token (alternatively referred to herein simply as a "state token"), wherein the state token may be created in response to a request from a client application, a client device, or another suitable client that communicates with the web server. In one implementation, the client state token created in operation 310 may be encrypted with one or more keys to secure the information contained therein (e.g., as described in further detail above with reference to FIG. 2). In one implementation, an operation 320 may further include the web server identifying one or more application session parameters associated with the request that may cause the web server to create the application state token in operation 310. In particular, operation 320 may generally include the web server identifying one or more parameters that uniquely describe a communication session associated with the request received from the client application, client device, or other suitable client that communicates with the web server (e.g., a session token that identifies one or more related messages exchanged with a particular communication protocol, such as HTTP). Alternatively (or additionally), the session parameters identified in operation 320 may uniquely identify a user or other identity associated with the request or the communication session (e.g., a single-sign on identity token, a digital signature, or any other suitable token or key uniquely associated with a particular user, application, or other identity).

In one implementation, in response to suitably identifying the one or more parameters associated with the application session, the web server may then embed a validator into the previously created application token previously in an operation 330. In particular, the validator may generally correspond to the session token that uniquely identifies the communication session associated with the request, the token that uniquely identifies the user, application, or other identity associated with the communication session, or another suitable token or key that can uniquely identify the application session associated with the request. As such, in one implementation, embedding the validator into the application state token in operation 330 may generally link the application state token to the session token, the user token, the application token, or other identity token, whereby the validator may represent a particular session or identity that created the application state token. In one implementation, the web server may then receive a subsequent request that includes the application state token in an operation 340, wherein the web server may inspect the validator in the application state token to determine whether or not to validate the subsequent request. In particular, an operation 350 may include the web server obtaining a session token, a user token, an application token, or other identity token from the subsequent request to identify one or more parameters for the current session associated with the request received in operation 350.

Accordingly, in one implementation, an operation 360 may include the web server further inspecting the validator in the application state token to determine whether or not the parameters associated with the current session match the validator identifying the session or identity that initially created the application state token. For example, as noted above, the validator may generally include a token that identifies the communication session that created the application state token in operation 310, or in scenarios where the state token created in operation 310 can persist longer than that communication session, the validator may further include a token that uniquely identifies the user, application, or other identity that created the application state token (e.g., an LDAP Distinguished Name). Thus, the validator embedded in the application state token may generally link the state token to the session or identity that created the state token, whereby the state token may be validated in an operation 380 in response to determining that the validator matches the current session parameters identified in operation 360, or alternatively rejected in an operation 370 in response to determining that the validator fails to match the current session parameters.

Figure 4:
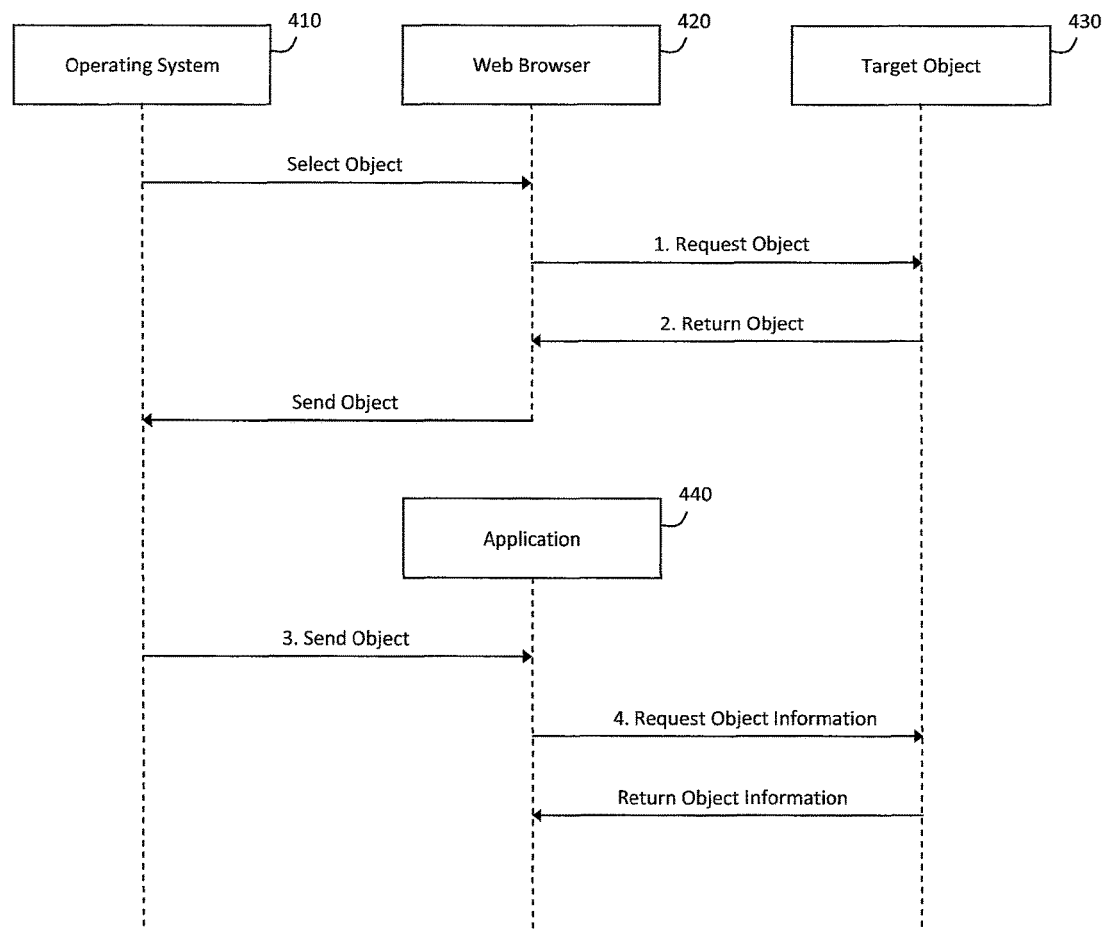
FIG. 4 illustrates an exemplary communication flow that can integrate different systems or applications with controlled state tokens, according to one aspect of the invention.

According to one aspect of the invention, FIG. 4 illustrates an exemplary communication flow 400 that can integrate different systems or applications with controlled state tokens. In particular, the method 400 illustrated in FIG. 4 may generally operate in a system substantially similar to the system shown in FIG. 1 and described in further detail above, wherein the method 400 illustrated in FIG. 4 may generally provide various mechanisms to maintain application state tokens to integrate the various different systems or applications. For example, the method 400 may be performed to copy state tokens that represent active communication sessions from processes running on a web browser 420 processes to an operating system 410, an application 440 external to the web browser 420, or another suitable client or application external to the web browser 420. As such, the communication flow 400 shown in FIG. 4 may be used to share information contained in an application state token between the web browser 420 and the operating system 410, the application 440, or the other external client or application to integrate state information.

In one implementation, as noted above, the communication flow 400 may provide a mechanism to integrate different systems or applications with controlled state tokens. For example, a web server may be configured with or otherwise implement one or more software solutions that the communication flow 400 integrates with one or more software solutions that can securely manage delivering web-based applications and cloud services provide operating system identities, or otherwise manage fine-grained control over application identities and policies (e.g., the communication flow 400 may integrate a Microsoft SharePoint web server with a CA SiteMinder® software product). For example, in one implementation, a user interacting with the web browser 420 may be assigned a unique identity, wherein the user may provide access credentials to a policy server (not shown) or another suitable authentication server. In response to validating the access credentials provided from the web browser 420, the policy server or other suitable authentication server may return a single sign-on (SSO) authentication token to a client device executing the web browser 420, wherein the SSO authentication token may encapsulate various permissions associated with the unique identity assigned to the user. As such, in one implementation, the client device may then derive a Microsoft .NET identity from the unique identity encapsulated in the SSO authentication token via a Microsoft .NET Forms Based Authentication mechanism, and the client device may include the .NET identity in a request subsequently communicated to the web server. In one implementation, the web server may then maintain a .NET created state token (e.g., a token named ASPXAUTH) from the .NET identity communicated from the client device. As such, in one implementation, the .NET created state token may be used to manage interactions between any suitable application 440 that interacts with the web server and thereby integrate the unique identity assigned to the user with the software installed on the web server.

In one implementation, integrating the various different systems or applications may be further provided through one or more software solutions that can provide full-fledged identities associated with a certain operating system 410 to the web server (e.g., a Microsoft SharePoint web server). In particular, these software solutions may generally obtain the unique identity assigned to the user that encapsulates the various permissions associated therewith to create a user token that provides a context within the particular operating system 410, which the web server may then use to control access to certain resources or objects 430. For example, to interact with a particular object 430 using a particular application 440, a user may request the object 430 within the web browser 420, which may cause the underlying operating system 410 to communicate information selecting the object 430 to the web browser 420. The web browser 420 may then communicate a request to the web server (i.e., in communication element 1), wherein the request may include the SSO authentication token associated with the user and information identifying the object 430. In one implementation, the web server may then return the requested object 430 to the web browser 420 in response to validating that the user has appropriate permissions to access the object 430 (i.e., in communication element 2).

In one implementation, the web browser 420 may then send the object to the operating system 410, which may cause the operating system 410 to launch the application 440 and send the object 430 to the application (i.e., in communication element 3). In one implementation, a separate web-based client associated with the application 440 may then query the web server to request information relating to the object (i.e., in communication element 4). As such, because the application 440 generally executes in a particular operating system 410 (e.g., a Microsoft Office application 440 running in a Microsoft Windows operating system 410), the request communicated from the web-based client associated with the application 440 may include the user token that provides the context within the operating system 410 that executes the application 440. In one implementation, the web server may then use the user token associated with the operating system 410 to control access to the requested information relating to the object 430 and return the request information to the application 440 in response to determining that the user token indicates that the requested information can be suitably provided to the application 440 without violating any governance, risk, and compliance policies that may be defined for the user token and/or the requested information.

Additionally, because the application 440 generally executes in the operating system 410 under a separate process from the web browser 420 used to initially authenticate the user and obtain the appropriate user token, the application 440 may be required to re-authenticate with the web server, the policy server, or another authentication server to suitably obtain access to the information requested in communication element 4. For example, in scenarios where the web server includes a default Microsoft SharePoint install or other implementation, the re-authentication that the application 440 performs may usually be transparent to the user interacting with the client device because Microsoft SharePoint generally uses Integrated Windows Authentication (IWA). Accordingly, in one implementation, communication element 4 may include an IWA challenge that generally includes the appropriate authentication server negotiating with the client device to attempt re-authenticating the application 440. In one implementation, the IWA challenge may cause a communications client (e.g., an HTTP client) embedded in the application 440 to establish a separate session for the user. However, as noted above, certain implementations may integrate or otherwise support a web server having a Microsoft SharePoint install with CA SiteMinder®, which may not necessarily use IWA to access SharePoint systems.

As such, the communication flow 400 may generally include transporting certain session information across a boundary that the operating system 410 defines between the web browser 420 and the application 440 (e.g., in communication element 3). In one implementation, to facilitate transporting the session information between the web browser 420 and the application 440 in communication element 3, the client device may maintain a common token store that can be accessed with the operating system 410, the web browser 420, the application 440, or any other suitable system or application associated with the client device. In one implementation, transporting the session information between the web browser 420 and the application 440 in communication element 3 may therefore configure the .NET state token created with the techniques described above (e.g., the ASPXAUTH token) to be persistent, whereby the persistent .NET state token may be used to maintain session state information within the application 440.

Furthermore, in one implementation, the communication flow 400 may configure one or more modules to transport the session information across the boundary between the web browser 420 and the application 440 in communication element 3 (e.g., to prevent the user from subsequently accessing the object 430 with a previously created .NET state token that the token store may persistently maintain even though the user may have logged out). For example, in one implementation, the modules configured to transport the session information between the web browser 420 and the application 440 may include the CA Global Services WWSI module, which can operate in a trusted user context associated with the operating system 410 (e.g., impersonating a SiteMinder® authenticated user to appropriately control access to resources or other objects 430 or information associated therewith). In other words, configuring the particular modules to transport the session information between the web browser 420 and the application 440 may ensure that the user attempting to access the object 430 properly corresponds to the originally authenticated user that accessed the object 430, whereby the session information may be persisted across the entire SSO environment involved in the communication flow 400.

Alternatively, in one implementation, rather than persisting the session information across the entire SSO environment involved in the communication flow 400, the session token may be transported from the web browser 420 to the application 440 using a separate, short-lived, persistent session token. In particular, as described in further detail above with reference to FIGS. 1 and 2, the persistent session token may include various control, validity, or other parameters that define a maximum lifetime or a maximum use count for the session token, wherein the control, validity, or other parameters may ensure that the session token will only be temporarily persistent (i.e., until the session token has been suitably transported to the target application 440). For example, in one implementation, the control, validity, or other parameters included in the session token may limit a usage lifetime associated with the session token to a process that the operating system 410 uses to transport the session token from the web browser 420 to the application 440. In one implementation, in response to the application 440 subsequently requesting the information associated with the object in communication element 4, the short-lived persistent session token created to temporarily represent the originally created session token may be replaced in the common token store with the actual session token originally created to represent the session.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system to control a state token, wherein the system comprises a processor configured to:

create a state token that maintains state information associated with a client device, wherein the state token includes one or more parameters that control the state token;

transmit the state token that maintains the state information to the client device, wherein at least one of the one or more parameters included in the state token controls the client device to provide access to the state token on the client device to an application when otherwise the application has no access to the state token or to prevent access to the state token by an application when otherwise the application has access to the state token;

receive a request to access a resource associated with the state token from the client device, wherein the request received from the client device includes the state token that maintains the state information associated with the client device; and grant the client device access to the resource in response to validating that the state token included in the request complies with at least one of the one or more parameters that control the state token, wherein the state token transmitted to the client device represents an authenticated session or an authenticated identity associated with the client device and wherein the client device creates a temporary state token that further represents the authenticated session or the authenticated identity in response to an application executing on the client device requesting access to the resource.

2. The system of claim 1, wherein the processor is further configured to:

encrypt the state token transmitted to the client device with a secure key, wherein the secure key that encrypts the state token causes the state token to be opaque to the client device; and decrypt the state token included in the request received from the client device with the secure key to validate the state token, whereby the secure key that encrypts the state token causes the state token to be transparent to the processor.

3. The system of claim 1, wherein the one or more parameters that control the state token comprises a valid domain and path, a maximum lifetime, and a maximum use count associated with the state token.

4. The system of claim 3, wherein the processor is further configured to renew the maximum lifetime or the maximum use count associated with the state token in response to at least one of the one or more parameters permitting an update to the state token.

5. The system of claim 1, wherein the processor is further configured to grant the client device access to the resource in response to validating that a current session or a current identity associated with the request matches a session or an identity represented in at least one of the one or more parameters that controls the state token.

6. The system of claim 1, wherein at least one of the one or more parameters included in the state token transmitted to the client device overrides a default scoping rule that a web browser executing on the client device would otherwise use to control access to the state token.

7. The system of claim 1, wherein the temporary state token has a maximum usage lifetime limited to a process that executes on the client device to transport the temporary state token to the application requesting access to the resource.

8. The system of claim 7, wherein the processor is further configured to replace the temporary state token on the client device with the state token created to maintain the state information associated with the client device in response to granting the client device access to the resource.

9. A method to control a state token, the method comprising:

creating a state token that maintains state information associated with a client device, wherein the state token includes one or more parameters that control the state token;

transmitting the state token that maintains the state information to the client device, wherein at least one of the one or more parameters included in the state token controls the client device to provide access to the state token on the client device to an application when otherwise the application has no access to the state token or to prevent access to the state token by an application when otherwise the application has access to the state token;

receiving a request to access a resource associated with the state token from the client device, wherein the request received from the client device includes the state token that maintains the state information associated with the client device; and granting the client device access to the resource in response to validating that the state token included in the request complies with at least one of the one or more parameters that controls the state token, wherein the state token represents an authenticated session or an authenticated identity associated with the client device and wherein the client device creates a temporary state token that further represents the authenticated session or the authenticated identity in response to an application executing on the client device requesting access to the resource.

10. The method of claim 9, further comprising:

encrypting the state token transmitted to the client device with a secure key, wherein the secure key that encrypts the state token causes the state token to be opaque to the client device; and decrypting the state token included in the request received from the client device with the secure key to validate the state token, whereby the secure key that encrypts the state token causes the state token to be transparent to a computer system that receives the request from the client device.

11. The method of claim 9, wherein at least one of the one or more parameters that controls the state token comprises a valid domain and path, a maximum lifetime, and a maximum use count associated with the state token.

12. The method of claim 11, further comprising renewing the maximum lifetime or the maximum use count associated with the state token in response to at least one of the one or more parameters permitting an update to the state token.

13. The method of claim 9, wherein a computer system grants the client device access to the resource in response to validating that a current session or a current identity associated with the request matches a session or an identity represented in at least one of the one or more parameters that controls the state token.

14. The method of claim 9, wherein at least one of the one or more parameters included in the state token transmitted to the client device overrides a default scoping rule that a web browser executing on the client device would otherwise use to control access to the state token.

15. The method of claim 9, wherein the temporary state token has a maximum usage lifetime limited to a process that executes on the client device to transport the temporary state token to the application requesting access to the resource.

16. The method of claim 15, further comprising replacing the temporary state token on the client device with the state token created to maintain the state information associated with the client device in response to granting the client device access to the resource.

\* \* \* \* \*